United States Patent [19]

Finkensiep

[11] 4,164,385
[45] Aug. 14, 1979

[54] EXTRUDER WITH MIXING CHAMBERS
[75] Inventor: Friedhelm Finkensiep, Krefeld-Uerdingen, Fed. Rep. of Germany
[73] Assignee: Henkel Kommanditgesellschaft auf Aktien, Dusseldorf-Holthausen, Fed. Rep. of Germany
[21] Appl. No.: 905,533
[22] Filed: May 12, 1978
[51] Int. Cl.² .............................................. B29F 3/02
[52] U.S. Cl. ................................... 425/204; 264/75; 264/211; 425/208; 366/79
[58] Field of Search .................. 425/204, 208; 264/75, 264/211; 366/79

[56] References Cited

U.S. PATENT DOCUMENTS

| | | | |
|---|---|---|---|
| 3,314,108 | 4/1967 | Wienand et al. | 264/75 |
| 3,398,219 | 8/1968 | Kelly et al. | 264/102 |
| 3,779,676 | 12/1973 | Bernard | 425/131 |
| 3,866,890 | 2/1975 | Tadmor et al. | 264/211 |
| 3,884,605 | 5/1975 | Grelon | 264/75 |
| 3,999,921 | 12/1976 | Thor et al. | 425/208 |
| 4,094,946 | 6/1978 | Finkenseip et al. | 425/204 |

*Primary Examiner*—William E. Schulz
*Attorney, Agent, or Firm*—Hammond & Littell

[57] ABSTRACT

A single extruder provided with a hopper at one end and a restricted nozzle at the opposite end and two press-screws arranged coaxially in one another within an outer jacket, each of said screws being provided with a male thread for feeding in the direction of said nozzle, said male threads extending into an outer annular space between said jacket and the outer press-screw and extending into an inner annular space between said two press-screws, said threads being oppositely oriented, means to rotate the outer of said press-screws and means maintaining the inner of said two press-screws stationary, said outer press-screw being provided with window-like openings communicating with said inner press-screw in the area of said hopper and separate feed means in said hopper to separately feed to said outer annular space and to said inner annular space through said window-like openings, the improvement consisting in that a rotating mixing element is positioned between said nozzle and said press-screws and attached to said rotating outer press-screw and having outer bearing support means in sliding contact with said outer jacket and inner bearing support means in sliding contact with said inner stationary press-screw, said outer and said inner bearing means being supported from said attachment to said outer press-screw by radial walls, said mixing element being provided with a series of open conical chambers between said radial walls, the inlets of said open conical chambers alternately opened to said inner annular space and said outer annular space and the outlets of said open conical chambers opened to said restricted nozzle.

3 Claims, 3 Drawing Figures

4,164,385

EXTRUDER WITH MIXING CHAMBERS

BACKGROUND OF THE INVENTION

Extruders having a coaxial screw-press with oppositely oriented external screw threads to feed different plastic substances to the nozzle, the outer screw being rotatable while the inner screw is stationary are described in Austrian Pat. No. 198,501 and a derivative of the same is described in U.S. Pat. No. 3,999,921 where the nozzle-side end of the outer screw has attached thereto a mixing element with vane type mixing tools, the tools sweeping the transport space of the outer screw as well as that of the inner screw. Thereby it is said to be possible to produce an extrusion with marbled texture evenly distributed over the cross section, which subsequently can be further processed, for example, to form marbled cakes of soap. The rotating mixing tools convey particles from the substance stream transported by the inner screw into the substance stream transported by the outer screw, as well as conversely conveying particles from the periphery inwardly. It is thereby prevented that areas without marbled texture can form. The result of this partial mixing of substance streams, while good in itself, depends on a plurality of other factors besides the technical design of the mixing element (form and number of the mixing tools). Thus, at a given speed of rotation of the outer screw, different temperatures and varying consistencies of the substances to be processed and also different pressures in the mixing zone lead to varying marbled patterns, giving the products made from the extrusion, such as compacted cakes of soap, a varying appearance or texture. Besides, the mixing tools, of relatively compact design, lead to an undesired pressure build-up, with the result that the output of the extruder is reduced.

OBJECTS OF THE INVENTION

An object of the present invention is the development of an extruder of the prior art type with a mixing element secured to the nozzle-side end of the outer rotating press-screw which gives a good marbling effect without causing a pressure build-up.

Another object of the present invention is the development of a single extruder provided with a hopper at one end and a restricted nozzle at the opposite end and two press-screws arranged coaxially in one another within an outer jacket, each of said screws being provided with a male thread for feeding in the direction of said nozzle, said male threads extending into an outer annular space between said jacket and the outer press-screw and extending into an inner annular space between said two press-screws, said threads being oppositely oriented, means to rotate the outer of said press-screws and means maintaining the inner of said two press-screws stationary, said outer press-screw being provided with window-like openings communicating with said inner press-screw in the area of said hopper and separate feed means in said hopper to separately feed to said outer annular space and to said inner annular space through said window-like openings, the improvement consisting in that a rotating mixing element is positioned between said nozzle and said press-screws and attached to said rotating outer press-screw and having outer bearing support means in sliding contact with said outer jacket and inner bearing support means in sliding contact with said inner stationary press-screw, said outer and said inner bearing means being supported from said attachment to said outer press-screw by radial walls, said mixing element being provided with a series of open conical chambers between said radial walls, the inlets of said open conical chambers alternately opened to said inner annular space and said outer annular space and the outlets of said open conical chambers opened to said restricted nozzle.

These and other objects of the present invention will become more apparent as the description thereof proceeds.

THE DRAWINGS

DESCRIPTION OF THE INVENTION

Figure 1:
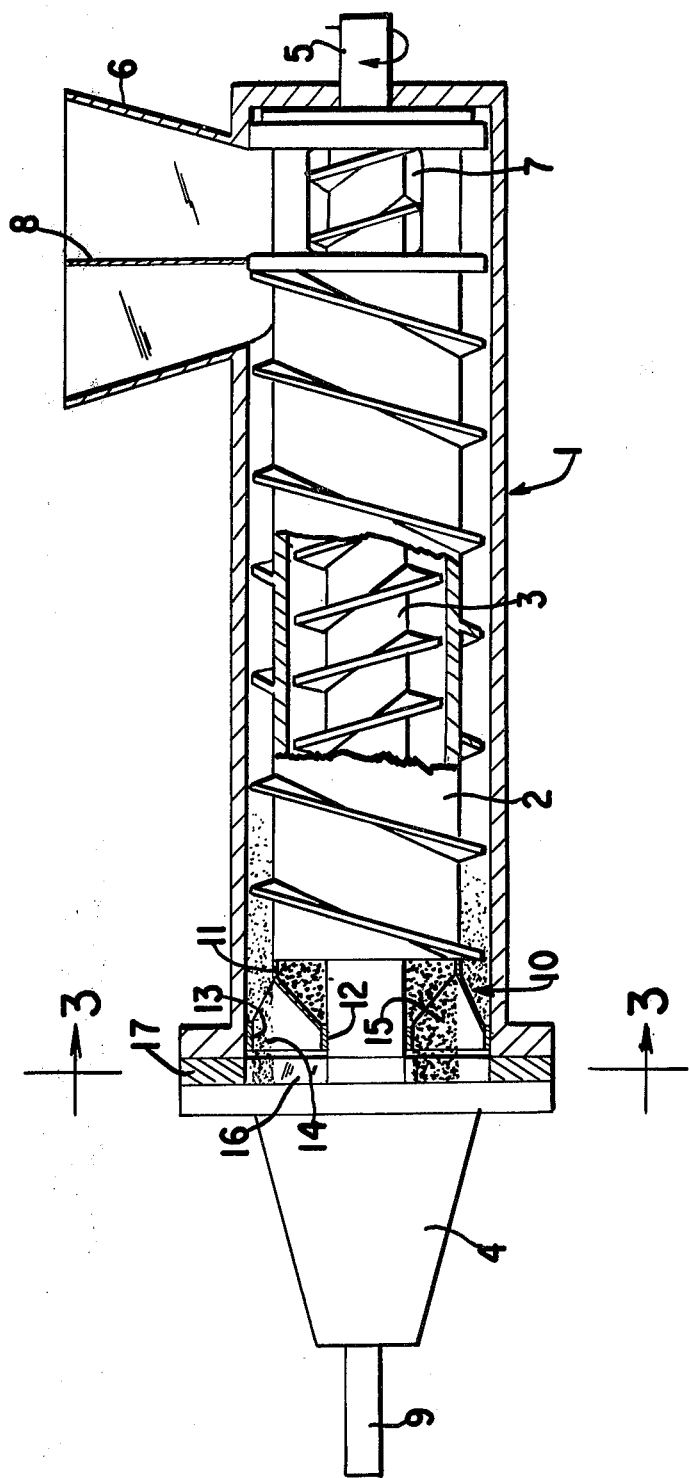
FIG. 1 is a longitudinal cross-section through the extruder of the invention, partially broken away.

The extruder of the present invention is an improvement over the known extruders in that it supplies a symmetrical color distribution of the processed substances at the end of the screw. Preferably means are to be provided which permit adjusting the texture or the fineness of the marbling. In addition the resistances caused by the mixing elements was reduced to a large extent, thus making it possible to increase the output of the extruder.

In the above mentioned extruder, the solution consists in that as mixing element a chamber head forming one of the bearings of the outer screw, with unilaterally open conical chambers, singly or in plurality, and with gaps therebetween, is provided, where the chambers are clamped between a fastening ring rigidly connected with the shaft butt of the outer screw and two coaxial bearing rings holding the outer screw between the shaft of the inner screw and the housing, at the opposite axial longitudinal end of the chamber head, in such a way that the substance inside the chambers conveyed by the inner screw and the substance in the gaps conveyed by the outer screw - or vice versa - can be moved on in a number of streaks corresponding to the number of chambers and gaps.

More particularly, the present invention relates to a single extruder provided with a hopper at one end and a restricted nozzle at the opposite end and two press-screws arranged coaxially in one another within an outer jacket, each of said screws being provided with a male thread for feeding in the direction of said nozzle, said male threads extending into an outer annular space between said jacket and the outer press-screw and extending into an inner annular space between said two press-screws, said threads being oppositely oriented, means to rotate the outer of said press-screws and means maintaining the inner of said two press-screws stationary, said outer press-screw being provided with window-like openings communicating with said inner press-screw in the area of said hopper and separate feed means in said hopper to separately feed to said outer annular space and to said inner annular space through said window-like openings, the improvement consisting in that a rotating mixing element is positioned between said nozzle and said press-screws and attached to said rotating outer press-screw and having outer bearing support means in sliding contact with said outer jacket and inner bearing support means in sliding contact with said inner stationary press-screw, said outer and said inner bearing means being supported from said attachment to said outer press-screw by radial walls, said mixing element being provided with a series of open conical chambers between said radial walls, the inlets of said open conical chambers alternately opened to said inner annular space and said outer annual space and the outlets of said open conical chambers opened to said restricted nozzle.

According to further invention, between the nozzle and the chamber head a stationary support ring coaxial with the screws and having radial spokes (or ribs) lying in front of the annular exit of the chamber head, is provided. The spokes are preferably designed with sharp edges.

The fineness of the marbling can be adjusted exactly by the number or chambers and gaps. Further also a corresponding change in design in the extruder cross-section of the extruded soap strand can be obtained with a change in the number of ribs.

When using the chamber head of the invention, a variety of effects can be obtained, which are reproducible exactly and independently of the temperature and consistency of the substances to be processed and independently of any pressure fluctuation in the mixing zone.

If, for example, the extruder is used with a chamber head consisting of only three chambers, and if the spoked support ring, which does not co-rotate with the outer screw, and which may also serve to support the shaft of the inner screw is placed directly in front of the annular exit of the chamber head co-rotating with the outer screw, then the parallel streaks of substances to be processed coming out of the chamber head are peeled off in slices by the spokes or ribs of the support ring acting like fixed knives, and are mixed in a coarse marbling.

The variation in the number of spokes causes changes in the characteristic design in the extrusion cross-section. When using, instead, a chamber head consisting, for example, of 24 chambers and gaps, this will lead in combination with a stationary support ring to a very fine, absolutely uniform distribution of the different color phases. It is thus possible by simple exchange of chamber heads to create different marbled textures. Thus, for example, with one chamber and gap a coarse, markedly marbled texture is obtained, while with 24 chambers and gaps a finely veined pattern is obtained in the soap strand.

Another economic advantage of the process resides in that by reduction of the resistance in the mixing zone a considerable increase of the extruder output is possible.

Figure 2:
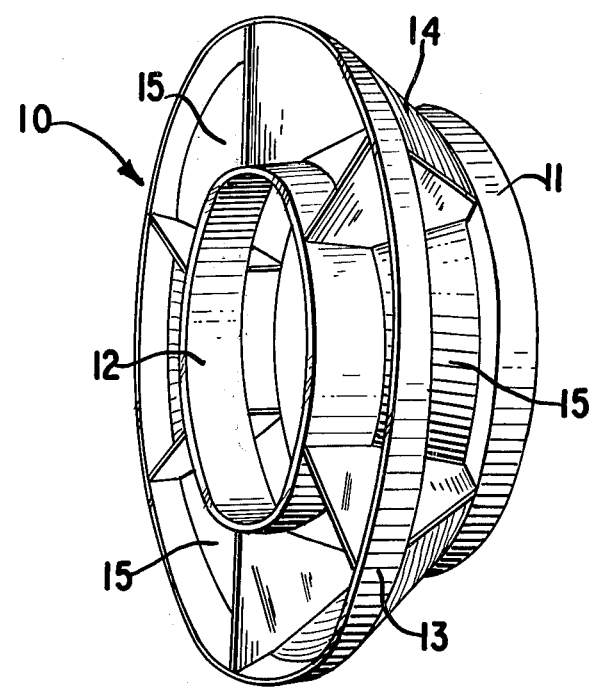
FIG. 2 is a perspective view of the mixing element of the invention.

Further details will be explained with reference to the schematic drawing of an embodiment, in which:

FIG. 1 shows an extruder,

FIG. 2 a chamber head in perspective and

Figure 3:
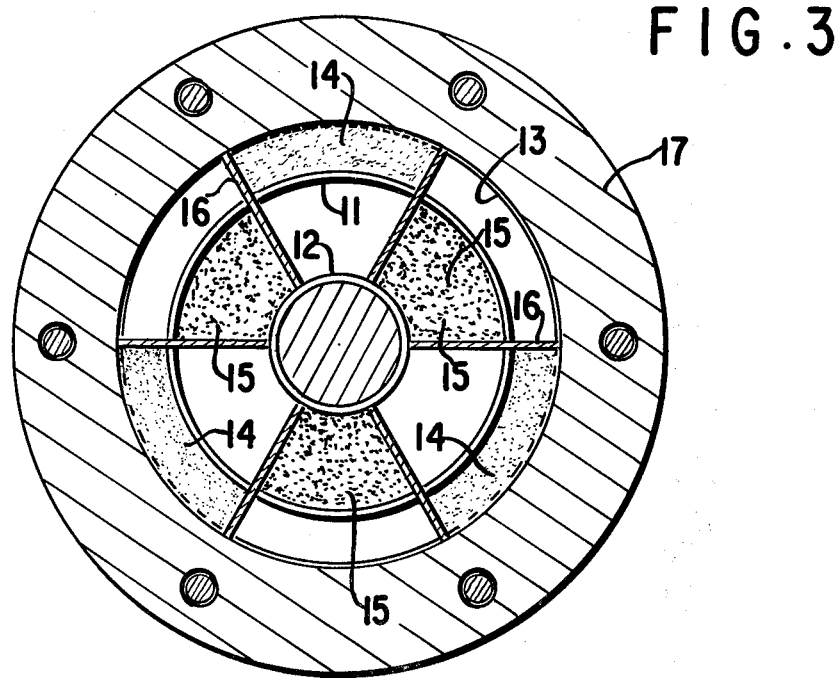
FIG. 3 is a cross-section in the direction III—III of FIG. 1.

FIG. 3 a cross-section of the ribs.

The extruder consists, according to FIG. 1, of two coaxial press-screws 2 and 3, each carrying an external screw thread, to feed different plastic substances to the nozzle 4. The outer screw 2 is drivable, for instance in the direction of the arrow through the shaft end 5, by means of a drive (not shown). The inner screw 3 is fixedly mounted. In the region of the hopper 6, window type openings 7 exist in the shaft of the outer screw 2, whereby a connection between the inner screw 2 and the hopper 6 is established. The hopper 6 is divided by a partition 8 so that the substances to be fed to the outer screw 2 and to the inner screw 3 cannot mix in the hopper 6. The threads of the outer screw 2 are oriented oppositely to those of the inner screw 3. In operation, an extrusion 9 of substances issues from the nozzle 4 of the extruder which, in the absence of mixing consists of a strand of two concentric substances.

The chamber head 10 of the invention is located at the nozzle-side end of the outer screw 2. The chamber head 10 is rigidly connected with the shaft of the outer screw 2 through the fastening ring 11. It rotates together with the outer screw and through bearing rings 12 and 13 forms at the same time the bearings thereof relative to the shaft of the stationary inner screw 3 and relative to the housing 1.

The chamber head 10 is designed so that the (rear) fastening ring 11 and the two (front) bearing rings 12 and 13 are combined by several ribs forming unilaterally open conical chambers 14, with continuous gaps 15 formed therebetween, as one compact static unit. The chamber head 10 may be screwed to the outer rotatable screw 2 through the fastening ring 11. In the embodiment (cf. Fig. 2) the chambers 14 and intermediate gaps 15 of the chamber head 10 are arranged so that the substance stream transported by the inner screw 3 inside the chambers, and the substance stream transported by the outer screw 2 in the gaps therebetween, is separately guided and divided to the end of the screw in a number of streaks of varying color and/or composition corresponding to the number of chambers and gaps. Thus, at the exit of a chamber head 10 having for example 24 chambers and 24 gaps, an annular substance cord with a total of 48 streaks is formed.

It is provided according to the invention to mix the substances extrusion emerging from the chamber head 10 so that the extrusion 9 issuing from the nozzle 4 receives a more or less finely marbled texture. The mixing of the parallel color streaks in the ring cross-section of the substance extrusion issuing from the chamber head occurs by the stationary spokes 16 (or ribs), acting like fixed knives of the support ring 17 following the chamber head 10. The support ring 17 can serve at the same time to support the shaft of the inner screw 3.

The more chambers 14 the chamber head 10 has, the finer will be marble effect.

Also, the more spokes 16 contained in the support ring 17 the shorter will be the slices which are peeled off from the substance extrusion issuing from the chamber head 10. If the chamber head 10 has few chambers 14, there will appear in the cross-section of the extrusion 9, besides a correspondingly coarse but striking marbled texture, the pattern caused by the stationary ribs 16 as an interesting design.

The extruder of the invention thus offers a plurality of possibilities with the partial but uniform mixing of two plastic substances of different color starting with an extremely fine distribution to a coarse, striking marbled texture.

The preceding specific embodiments are illustrative of the practice of the invention. It is to be understood however, that other expedients known to those skilled in the art or disclosed herein, may be employed without departing from the spirit of the invention or the scope of the appended claims.

I claim:

1. A single extruder provided with a hopper at one end and a restricted nozzle at the opposite end and two press-screws arranged coaxially in one another within an outer jacket, each of said screws being provided with a male thread for feeding in the direction of said nozzle, said male threads extending into an outer annular space between said jacket and the outer press-screw and extending into an inner annular space between said two press-screws, said threads being oppositely oriented, means to rotate the outer of said press-screws and means maintaining the inner of said two press-screws stationary, said outer press-screw being provided with window-like openings communicating with said inner press-screw in the area of said hopper and separate feed means in said hopper to separately feed to said outer annular space and to said inner annular space through said window-like openings, the improvement consisting in that a rotating mixing element is positioned between said nozzle and said press-screws and attached to said rotating outer press-screw and having outer bearing support means in sliding contact with said outer jacket and inner bearing support means in sliding contact with said inner stationary press-screw, said outer and said inner bearing means being supported from said attachment to said outer press-screw by radial walls, said mixing element being provided with a series of open conical chambers between said radial walls, the inlets of said open conical chambers alternately opened to said inner annular space and said outer annular space and the outlets of said open conical chambers opened to said restricted nozzle.

2. The extruder of claim 1 having a series of stationary ribs extending across the outlet of said rotating mixing element before said restricted nozzle.

3. The extruder of claim 2 wherein said stationary ribs are formed with sharp edges.

* * * * *